United States Patent
Baba

(10) Patent No.: US 9,756,204 B2
(45) Date of Patent: Sep. 5, 2017

(54) IMAGE READING DEVICE FOR READING IMAGE OF DOCUMENT, IMAGE FORMING APPARATUS, AND IMAGE READING METHOD

(71) Applicant: KYOCERA Document Solutions Inc., Osaka-shi, Osaka (JP)

(72) Inventor: Masaki Baba, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/085,145

(22) Filed: Mar. 30, 2016

(65) Prior Publication Data

US 2016/0295048 A1   Oct. 6, 2016

(30) Foreign Application Priority Data

Mar. 31, 2015   (JP) ................................ 2015-072967

(51) Int. Cl.
*H04N 1/00* (2006.01)
*H04N 1/23* (2006.01)

(52) U.S. Cl.
CPC ....... *H04N 1/00801* (2013.01); *H04N 1/0032* (2013.01); *H04N 1/00588* (2013.01); *H04N 1/00708* (2013.01); *H04N 1/00795* (2013.01); *H04N 1/2338* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2008/0273222 A1* | 11/2008 | Cui | H04N 1/00363 358/1.15 |
| 2014/0029021 A1* | 1/2014 | Omata | H04N 1/393 358/1.2 |
| 2016/0134769 A1* | 5/2016 | Yamamoto | H04N 1/00554 358/449 |

FOREIGN PATENT DOCUMENTS

JP    2007187735 A    7/2007

* cited by examiner

*Primary Examiner* — Barbara Reinier
(74) *Attorney, Agent, or Firm* — Alleman Hall Creasman & Tuttle LLP

(57) ABSTRACT

A document feed portion of an image reading device is capable of feeding a document placed on a first document placement portion, to a predetermined reading position. A size detection portion detects a size of the document placed on the first document placement portion. A storage processing portion stores size information indicating the size of the document detected by the size detection portion, into a predetermined storage medium. An image reading portion performs a reading process of scanning a read surface of the document placed on a second document placement portion, to read an image. A setting portion sets the size information stored into the storage medium by the storage processing portion, as size information to be used for the reading process by the image reading portion.

6 Claims, 9 Drawing Sheets

FIG. 3
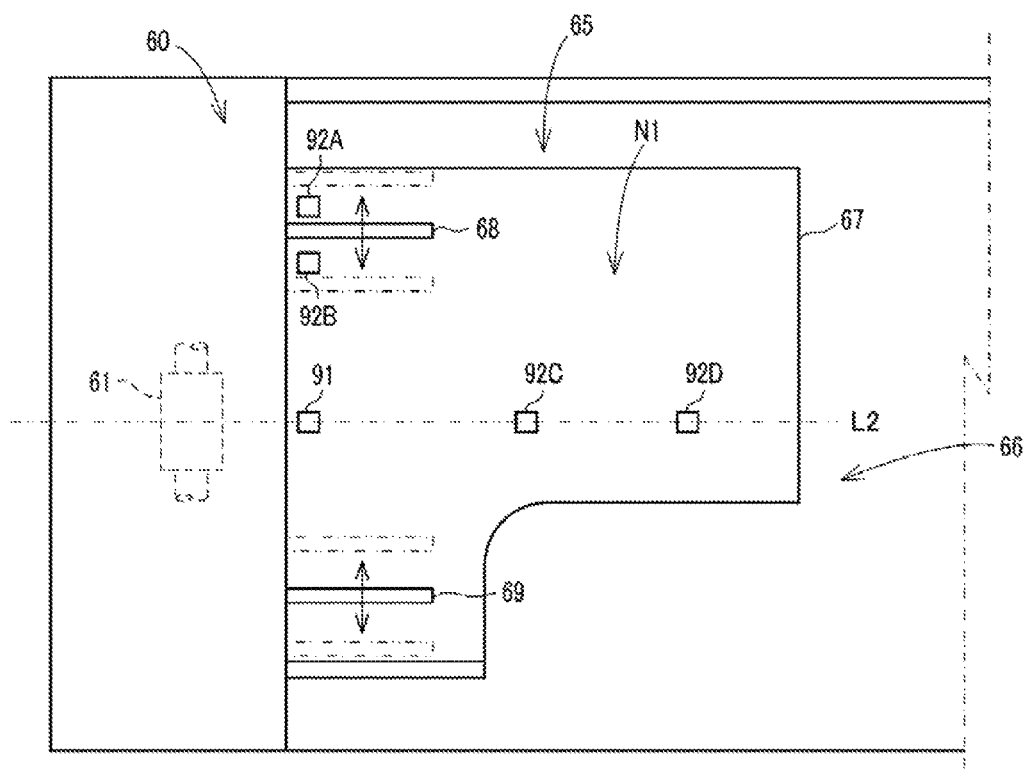
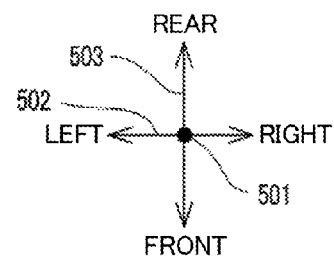

IMAGE READING DEVICE FOR READING IMAGE OF DOCUMENT, IMAGE FORMING APPARATUS, AND IMAGE READING METHOD

INCORPORATION BY REFERENCE

This application is based upon and claims the benefit of priority from the corresponding Japanese Patent Application No. 2015-072967 filed on Mar. 31, 2015, the entire contents of which are incorporated herein by reference.

BACKGROUND

The present disclosure relates to an image reading device that includes document placement portions on which documents are placed and a document feed portion referred to as so-called ADF, an image forming apparatus including the image reading device, and an image reading method for reading an image of a document by the image reading device.

An image reading device is known which includes a detection sensor that detects the size of a document that is set on a document feed portion that feeds documents and is referred to as so-called ADF. In addition, as this type of image reading device, an image reading device of a type is also known which is not provided with a detection sensor that detects the size of a document placed on a document placement portion that is formed of a glass plate or the like. In such an image reading device, when causing the image reading device to read an image of a document placed on the document placement portion, a user needs to notify the image reading device of the size of the document. Here, the user may notify the image reading device of the size of the document by performing an input operation such as looking for and pressing an operation button corresponding to the size of the document, which is a reading target, among a plurality of operation buttons that are provided on an operation panel so as to correspond to a plurality of document sizes, respectively. As conventional art, an image forming apparatus is known which includes a scanner that does not include a detection sensor that detects the size of a document.

SUMMARY

An image reading device according to one aspect of the present disclosure includes a first document placement portion, a document feed portion, a size detection portion, a storage processing portion, a second document placement portion, an image reading portion, and a setting portion. On the first document placement portion, a document can be placed. The document feed portion is capable of feeding the document placed on the first document placement portion, to a predetermined reading position. The size detection portion is configured to detect a size of the document placed on the first document placement portion. The storage processing portion is configured to store size information indicating the size of the document detected by the size detection portion, into a predetermined storage medium. On the second document placement portion, the document can be placed. The image reading portion is configured to perform a reading process of scanning a read surface of the document placed on the second document placement portion, to read an image. The setting portion is configured to set the size information stored into the storage medium by the storage processing portion, as size information to be used for the reading process by the image reading portion.

An image forming apparatus according to one aspect of the present disclosure includes the image reading device, a sheet selection processing portion, and an image forming portion. The sheet selection processing portion is configured to select a sheet of a size on which the image read by the image reading device should be formed, on the basis of the size information set by the setting portion. The image forming portion is configured to form the image on the sheet selected by the sheet selection processing portion.

An image reading method according to one aspect of the present disclosure is an image reading method for an image reading device including: a first document placement portion on which a document can be placed; a document feed portion capable of feeding the document placed on the first document placement portion, to a predetermined reading position; a second document placement portion on which the document can be placed; and an image reading portion capable of performing a reading process of scanning a read surface of the document placed on the second document placement portion, to read an image. The image reading method includes a first step, a second step, and a third step. The first step is a step of detecting a size of the document placed on the first document placement portion. The second step is a step of storing size information indicating the size of the document detected in the first step, into a predetermined storage medium. The third step is a step of setting the size information stored into the storage medium in the second step, as size information to be used for the reading process by the image reading portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a plan view of an ADF.

DETAILED DESCRIPTION

Figure 1:
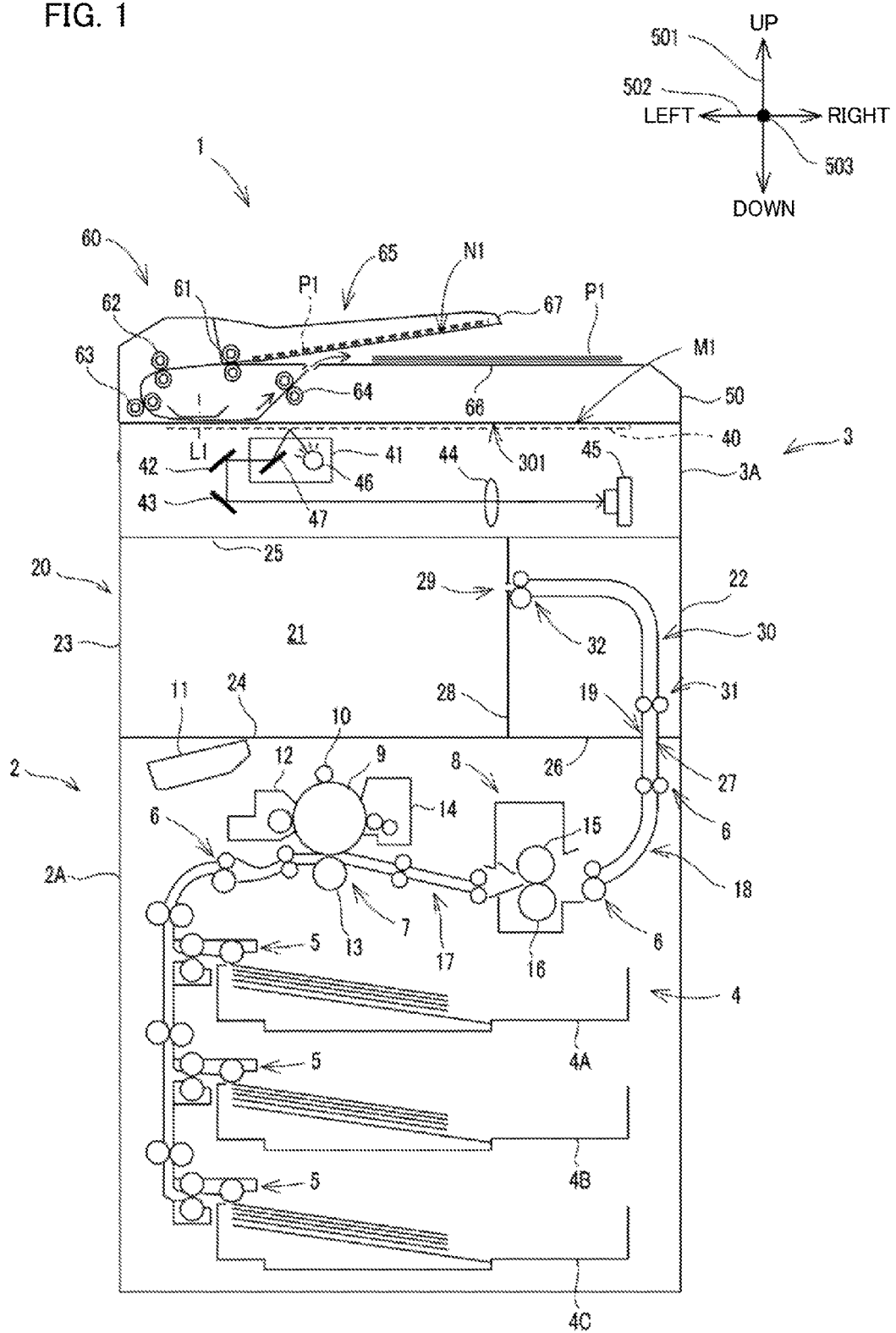
FIG. 1 is a diagram showing the configuration of an image forming apparatus according to a first embodiment of the present disclosure.

Hereinafter, embodiments of the present disclosure will be described with reference to the drawings as appropriate.

It should be noted that the following embodiments are merely examples embodying the present disclosure and do not limit the technical scope of the present disclosure.

First Embodiment

The configuration of an image forming apparatus 1 according to a first embodiment of the present disclosure will be described with reference to FIGS. 1 to 4. For convenience of explanation, the vertical direction in an installation state where the image forming apparatus 1 can be used (a state shown in FIG. 1) is defined as an up-down direction 501. A right-left direction 502 is defined on the basis of the front face of the image forming apparatus 1 in the installation state. A front-rear direction 503 is defined with, as a front face (front surface), a surface at a side, at which a later-described operation display portion 80 is provided, in the installation state.

The image forming apparatus 1 is a multifunction peripheral having functions such as a print function, a copy function, a facsimile function, and a scanning function. In addition, the image forming apparatus 1 is a multifunction peripheral referred to as so-called in-body discharge type. The image forming apparatus 1 is not limited to the multifunction peripheral, and the present disclosure is applicable to even dedicated machines such as a printer, a copying machine, and a FAX apparatus.

Figure 4:
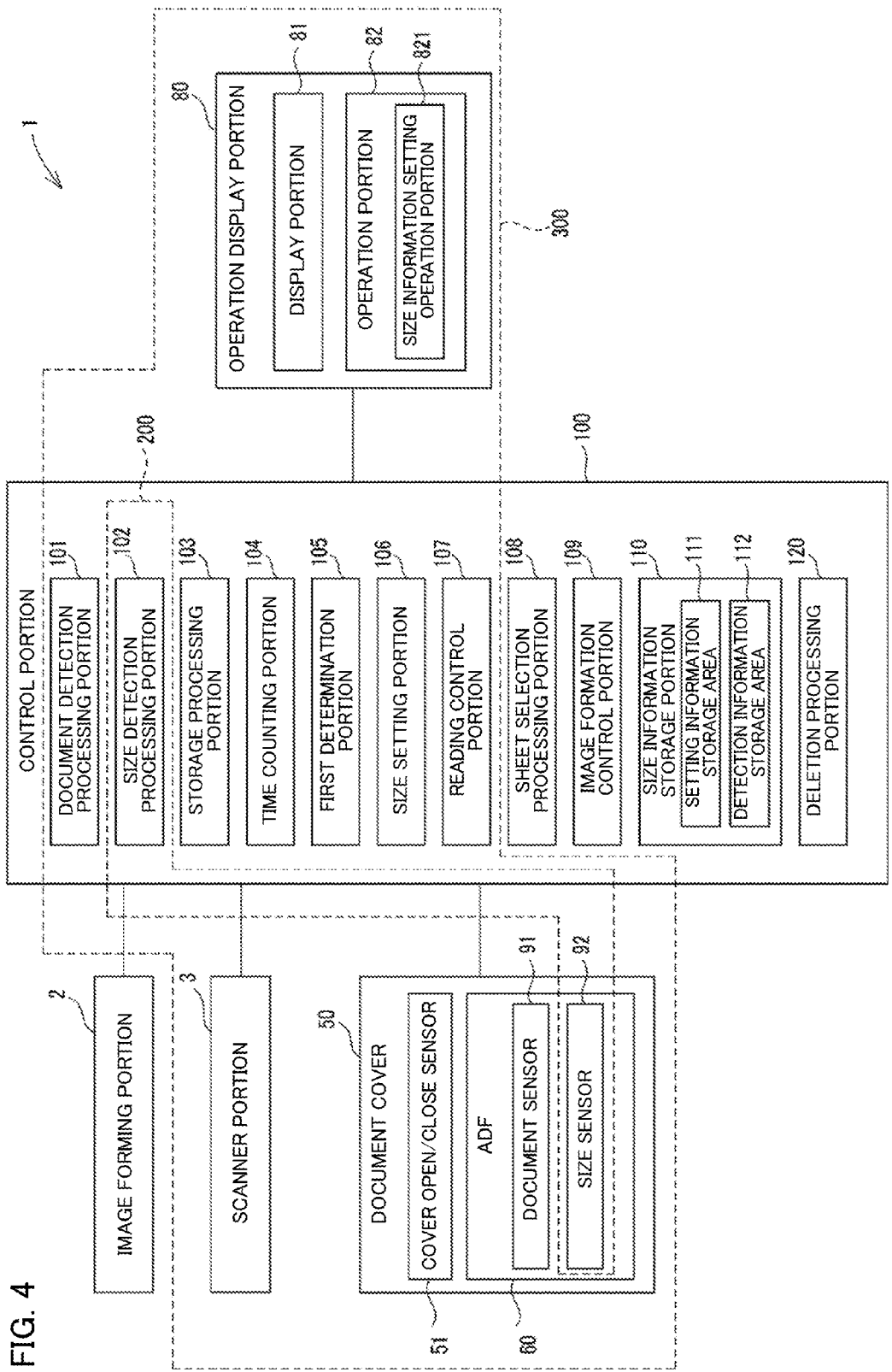
FIG. 4 is a block diagram showing the configuration of the image forming apparatus.

The image forming apparatus 1 includes an image forming portion 2, a support portion 20, an image reading device 300 (see FIG. 4), a document cover 50, the operation display portion 80, and a control portion 100 (see FIG. 4).

The image forming portion 2 forms an image on a sheet member. The image forming portion 2 forms an image on a sheet member on the basis of image data read by a later-described scanner portion 3 or image data received from an information processing apparatus such as an external personal computer via a communication I/F portion that is not shown.

The image forming portion 2 is provided at a lower portion of the image forming apparatus 1, includes a housing 2A (see FIG. 1) having a rectangular parallelepiped shape, and includes a sheet feed portion 4, a plurality of conveying rollers 6, a transfer portion 7, and a fixing portion 8 within the housing 2A.

The sheet feed portion 4 includes a plurality of sheet feed cassettes 4A, 4B, and 4C. Sheet members having different sizes are stored in the sheet feed cassettes 4A, 4B, and 4C. Sheet feed rollers 5 feed the sheet members stored in the sheet feed cassettes 4A, 4B, and 4C. The plurality of conveying rollers 6 convey the fed sheet members to a carrying-out port 19.

The transfer portion 7 includes a photosensitive drum 9, a charging portion 10, a laser scanning unit (LSU) 11, a developing portion 12, a transfer roller 13, and a cleaning portion 14.

In the transfer portion 7, the charging portion 10 charges the surface of the photosensitive drum 9 at a uniform potential, and the LSU 11 performs scanning with laser light on the charged surface of the photosensitive drum 9 in accordance with image data, to form an electrostatic latent image on the photosensitive drum 9. The developing portion 12 attaches toner to the electrostatic latent image to visualize the electrostatic latent image into a toner image. By a predetermined transfer bias being applied to the transfer roller 13, the transfer roller 13 transfers the toner image formed on the photosensitive drum 9, onto the sheet member fed from the sheet feed portion 4. The sheet member on which the toner image has been transferred is conveyed on a conveyance path 17 and to the fixing portion 8.

When the sheet member passes through a nip portion between a heating roller 15 and a pressure roller 16, the fixing portion 8 fixes, on the sheet member, the toner image transferred onto the sheet member, by heat. The sheet member on which the toner image has been fixed by the fixing portion 8 is conveyed by the conveying rollers 6 on a conveyance path 18 extending in the vertical direction, and is discharged through the carrying-out port 19 at the end of the conveyance path 18.

As described above, the image forming portion 2 according to the present embodiment performs image formation on the basis of electrophotography, but may perform image formation on the basis of an inkjet recording method or another recording method other than the inkjet recording method.

The support portion 20 connects the image forming portion 2 and the scanner portion 3 such that the image forming portion 2 and the scanner portion 3 are spaced vertically from each other to form, between the image forming portion 2 and the scanner portion 3, a discharge space 21 to which the sheet member on which an image has been formed is discharged.

The support portion 20 includes: a right side wall portion 22 provided on an upper surface 24 of the image forming portion 2 and at the right side of the discharge space 21; and a back surface wall portion 23 provided on the upper surface 24 of the image forming portion 2 and at the rear side of the discharge space 21. The scanner portion 3 is supported by the right side wall portion 22 and the back surface wall portion 23 in a state where the scanner portion 3 is placed on the right side wall portion 22 and the back surface wall portion 23. Thus, the lower side of the discharge space 21 is demarcated by the upper surface 24 of the image forming portion 2, and the upper side of the discharge space 21 is demarcated by a lower surface 25 of the scanner portion 3. The discharge space 21 is opened to the outside at the left side and the front side in the image forming apparatus 1.

As shown in FIG. 1, the right side wall portion 22 includes a carrying-in port 27, a discharge port 29, a conveyance path 30, a conveying roller pair 31, and a discharge roller pair 32. The carrying-in port 27 is provided in a bottom surface 26 adjacent to the image forming portion 2 and receives the sheet member on which the image has been formed and which has been conveyed from the image forming portion 2. The discharge port 29 is formed in the upper side of a side wall 28 facing the discharge space 21, and the sheet member is discharged therethrough to the discharge space 21. The conveyance path 30 is formed from the carrying-in port 27 to the discharge port 29, and the sheet member having entered the carrying-in port 27 is conveyed thereon to the discharge port 29 side by the conveying roller pair 31 provided on an end portion of the conveyance path 30 at the carrying-in port 27 side. Then, the sheet member conveyed on the conveyance path 30 is discharged through the discharge port 29 toward the discharge space 21 by the discharge roller pair 32 provided on an end portion of the conveyance path 30 at the discharge port 29 side. The sheet member discharged to the discharge space 21 is placed on the upper surface 24.

Figure 2:
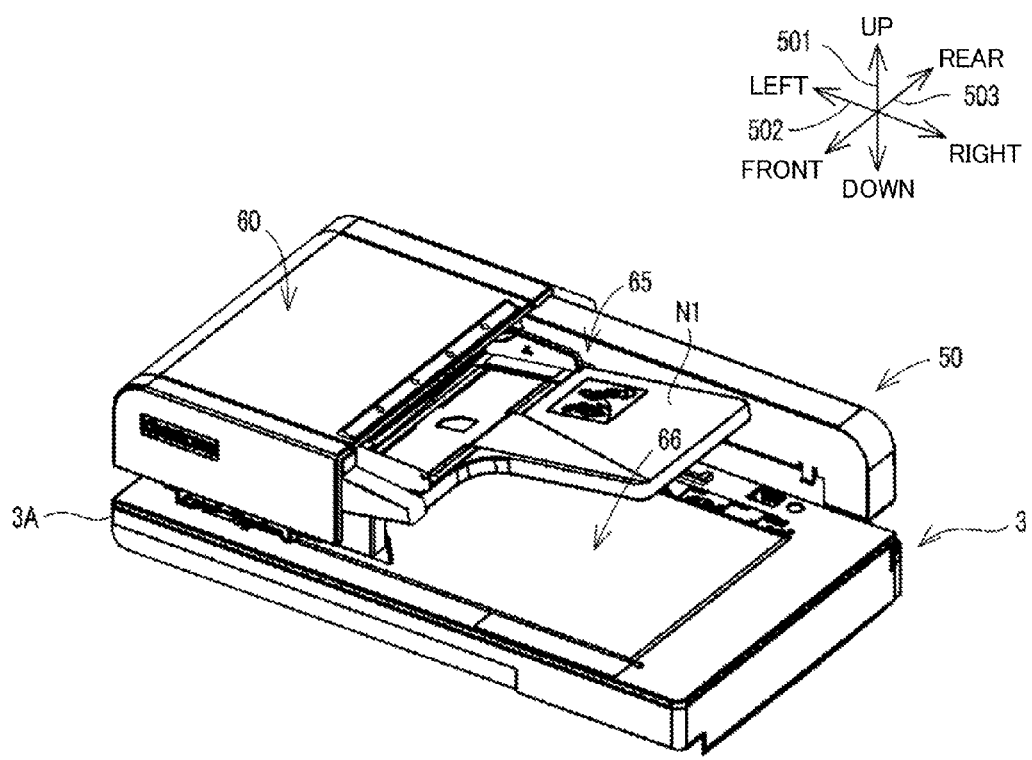
FIG. 2 is an external perspective view of a scanner portion and a document cover of the image forming apparatus shown in FIG. 1.

The image reading device 300 includes the scanner portion 3. The scanner portion 3 performs an image reading process of reading an image of a document P1. As shown in FIGS. 1 and 2, the scanner portion 3 includes a housing 3A. As shown in FIG. 1, the scanner portion 3 includes a contact glass 40, a reading unit 41, mirrors 42 and 43, an optical lens 44, and an imaging element 45 within the housing 3A. The upper glass surface of the contact glass 40 is a document placement surface M1 on which the document P1 can be placed, and the upper surface of the scanner portion 3 is configured to include the document placement surface M1. The contact glass 40 is an example of a second document placement portion of the present disclosure.

The reading unit 41 is provided below the contact glass 40. The reading unit 41 includes an LED light source 46 and a mirror 47, and is configured to be movable in the right-left direction 502 by a movement mechanism (not shown) using a drive motor such as a stepping motor. The movement mechanism has a known configuration including a pair of pulleys and a drive belt extended on and between these pulleys. Upon reception of a driving force from the drive motor that is not shown, the movement mechanism slides the reading unit 41 in the right-left direction 502. The reading unit 41 is an example of an image reading portion of the present disclosure that performs a reading process of scanning a read surface of the document P1 placed on the contact glass 40, to read an image.

When light is emitted from the LED light source 46, the mirror 47 reflects, toward the mirror 42, the light reflected by the document P1 placed on the document placement surface M1. The imaging element 45 is a photoelectric conversion element that receives the light reflected by the mirrors 42 and 43 and outputs an electric signal (voltage) corresponding to the amount of the received light (the intensity of brightness). The electric signal corresponding to the amount of the received light is subjected to A/D conversion and then transmitted to the control portion 100 (see FIG. 4) described later.

The document cover 50 is provided above the scanner portion 3. The document cover 50 is supported by the scanner portion 3 so as to be able to open/close between a closed attitude in which the document cover 50 covers the document placement surface M1 and an open attitude in which the document cover 50 is separated from the document placement surface M1 to expose the document placement surface M1, with an end portion of the scanner portion 3 at the upper surface rear side (back surface side) as a rotation axis. In the closed attitude, the document cover 50 holds the document P1 placed on the document placement surface M1, such that the lower surface of the document P1 extends along the document placement surface M1, and the document cover 50 also blocks external light travelling toward the reading unit 41. The document cover 50 is an example of a cover member of the present disclosure, and the document placement surface M1 is an example of a sheet placement surface of the present disclosure.

As shown in FIG. 4, the document cover 50 includes a cover open/close sensor 51. In addition, as shown in FIGS. 1 to 4, the document cover 50 includes an auto document feeder (ADF) 60. As shown in FIGS. 1 to 3, the ADF 60 includes a document set portion 65, a sheet discharge portion 66, and conveying rollers 61 to 64 (see FIG. 1).

The cover open/close sensor 51 is provided at a rotation support portion of the document cover 50 and is a sensor such as a limit switch. The cover open/close sensor 51 outputs, to the control portion 100, a cover detection signal whose ON/OFF state is switched between when the document cover 50 is in the closed attitude and when the document cover 50 is in an attitude at the open attitude side from the closed attitude. In the present embodiment, the cover open/close sensor 51 outputs an ON signal when the document cover 50 is in the closed attitude. The cover open/close sensor 51 is an example of an attitude detection portion of the present disclosure.

The document set portion 65 is provided in the document cover 50 and at a position opposite to an opposing surface 301 (see FIG. 1) opposing the document placement surface M1. In the document set portion 65, a document placement surface N1 (see FIGS. 1 to 3) on which one or a plurality of documents P1 are to be placed is formed. The document set portion 65 is an example of a first document placement portion of the present disclosure.

The conveying rollers 61 to 64 convey the documents P1, one by one, which are set on the document set portion 65, and feed the documents P1 such that the documents P1 pass through a document reading position L1 determined on the contact glass 40, rightward in the right-left direction 502. The ADF 60 is an example of a document feed portion of the present disclosure, and the document reading position L1 is an example of a predetermined reading position of the present disclosure. Of the conveying rollers 61 to 64, the conveying rollers 61 disposed at the most upstream position are feeding rollers that are pressed against the uppermost document P1 of the documents P1 set on the document set portion 65 and feeds the documents P1 one by one to the downstream side, that is, to the left side in the right-left direction 502. To the sheet discharge portion 66, the documents P1 conveyed by the conveying rollers 61 to 64 are discharged.

As shown in FIG. 3, the document set portion 65 includes a document placement table 67, a first document restriction plate 68, a second document restriction plate 69, a document sensor 91, and a plurality of size sensors 92A to 92D.

The first document restriction plate 68 and the second document restriction plate 69 are provided so as to stand on the document placement table 67 and extend along the right-left direction 502 of the image forming apparatus 1, in other words, the direction of feeding by the conveying rollers 61. The first document restriction plate 68 and the second document restriction plate 69 are opposed to each other in a state of being spaced apart from each other.

The first document restriction plate 68 and the second document restriction plate 69 move close to or away from each other in the front-rear direction 503 of the image forming apparatus 1 in an interlocking manner by a rack gear and a pinon gear that are not shown.

For example, when an operation of moving the first document restriction plate 68 in the direction away from the second document restriction plate 69 is performed, the second document restriction plate 69 moves, in conjunction with this movement, in the direction away from the first document restriction plate 68. In addition, when an operation of moving the first document restriction plate 68 in the direction approaching the second document restriction plate 69 is performed, the second document restriction plate 69 moves, in conjunction with this movement, in the direction approaching the first document restriction plate 68. The same applies also when an operation of moving the second document restriction plate 69 in the direction away from the first document restriction plate 68 or in the direction approaching the first document restriction plate 68 is performed.

The first document restriction plate 68 and the second document restriction plate 69 are disposed at positions corresponding to a size in a width direction of the documents P1 placed on the document set portion 65 by the user. Accordingly, the first document restriction plate 68 and the second document restriction plate 69 contact end portions in the width direction of the document P1 to direct the documents P1 along the direction of feeding by the conveying rollers 61 and to restrict movement of the documents P1 in a direction crossing the direction of feeding.

The document sensor 91 and the size sensors 92A to 92D are provided in the document placement table 67. The document sensor 91 is a sensor for detecting presence/absence of the documents P1 on the document placement table 67. The size sensors 92A to 92D are sensors for detecting the size of the documents P1 placed on the document placement table 67.

Each of the document sensor 91 and the size sensors 92A to 92D is a reflection type optical sensor that includes: a light emitter composed of, for example, a light-emitting diode; and a light receiver composed of, for example, a phototransistor. When the document P1 is present in a detection area of each of the document sensor 91 and the size sensors 92A to 92D, light outputted from the light emitter is reflected by the document P1, and the reflected light is received by the light receiver. When the light receiver does not receive the reflected light, the light receiver generates a signal having an output value less than a predetermined threshold. When the light receiver receives the reflected light, the light receiver generates a signal having an output value exceeding the threshold. These signals are outputted as output signals of the document sensor 91 and the size sensors 92A to 92D to the control portion 100.

The document sensor 91 is disposed at a position that allows presence of the documents P1 to be detected regardless of the size of the documents P1 placed on the document placement table 67. Specifically, the document sensor 91 is provided near the conveying rollers 61 and at a position on a straight line L2 (see FIG. 3) that passes through the conveying rollers 61 and extends along the direction of feeding. The document sensor 91 may be a sensor of a type in which a predetermined member is displaced by the weight of the documents P1 placed on the document placement table 67, and a switch that is not shown is turned ON by the displacement of the member.

The plurality of size sensors 92A to 92D are dispersedly disposed such that the size of the documents P1 is recognizable on the basis of a plurality of output signals outputted from the plurality of size sensors 92A to 92D. That is, the plurality of size sensors 92A to 92D are disposed at positions that are different from each other in at least one of the right-left direction 502 and the front-rear direction 503. More specifically, in the present embodiment, of the plurality of size sensors 92A to 92D, the size sensors 92A and 92B are disposed at positions that are the same in the right-left direction 502 and are different from each other in the front-rear direction 503. The size sensors 92A and 92B detect the size in the width direction of the documents P1. In addition, of the plurality of size sensors 92A to 92D, the other size sensors 92C and 92D are disposed at positions that are the same in the front-rear direction 503 and are different from each other in the right-left direction 502. Specifically, the other size sensors 92C and 92D are provided at different positions on the straight line L2. Accordingly, combinations of signal states of the plurality of output signals outputted from the plurality of size sensors 92A to 92D corresponds, in a one-to-one relation, to the sizes of the documents P1 that can be placed on the document placement table 67. Each of the signal states is a state where the output value of the output signal is greater than the threshold or a state where the output value of the output signal is less than the threshold. The size sensors 92A and 92B that detect the size in the width direction are not limited to the aforementioned optical sensors, and, for example, a rotary encoder that detects positions of the first document restriction plate 68 and the second document restriction plate 69 in the width direction may also be used.

The image forming apparatus 1 is able to perform reading processes of two reading methods. The first reading method is a reading method in which the image of the document P1 placed on the contact glass 40 is read by the scanner portion 3. The second reading method is a reading method in which the image of the document P1 placed on the document set portion 65 is read by the scanner portion 3.

Specifically, in the reading process of the first reading method, first, by the user, the document P1 is placed on the contact glass 40 and the document cover 50 is made into the closed attitude. Then, by the user, an operation for instructing the image forming apparatus 1 to start image reading is performed using the operation display portion 80. In this case, no document P1 is placed on the document set portion 65, and a signal indicating detection of the document P1 is not outputted from the document sensor 91.

When the operation for instructing start of the image reading is performed by the user using the operation display portion 80, the drive motor moves the reading unit 41 located at a predetermined reading start position at the left side, along the right-left direction 502 by a movement amount corresponding to the size of the document P1. In addition, in parallel with this, a process is performed in which the LED light source 46 continuously emits one line of light sequentially. Accordingly, scanning in the right-left direction 502 is performed with the light emitted from the LED light source 46 toward the contact glass 40.

The light reflected from the document P1 is guided via the mirrors 47, 42, and 43 and the optical lens 44 to the imaging element 45, and light amount data corresponding to the amount of the light received by the imaging element 45 is sequentially transmitted to an image processing portion (not shown). The image processing portion performs a $\gamma$ correction process, a color correction process, which is adjustment of RGB color balance, a color conversion process from RGB data to CMYK data, and the like on the light amount data to generate image information on the document P1.

In this manner, in the first reading method, the scanner portion 3 reads the image of the document P1 placed on the document placement surface M1. A reading end position of the reading unit 41 is different depending on the size of the document P1 which is a reading target.

Meanwhile, in the reading process of the second reading method, first, by the user, the document cover 50 is made into the closed attitude and the document P1 is placed on the document set portion 65. In addition, by the user, the first document restriction plate 68 and the second document restriction plate 69 are set at positions corresponding to the size of the document P1 placed on the document set portion 65.

Then, when an operation for instructing the image forming apparatus 1 to start image reading is performed by the user using the operation display portion 80, the ADF 60 sequentially conveys the one or more documents P1, which are set on the document set portion 65, by the plurality of conveying rollers 61 to 64. Then, the ADF 60 moves each document P1 such that the document P1 passes through the document reading position L1 determined on the contact glass 40, rightward along the right-left direction 502. During conveyance of the documents P1 by the ADF 60, the reading unit 41 is located below the document reading position L1 and emits light from the LED light source 46 toward the contact glass 40 at this position. A path of light reflected from the document P1 and a method for generating image information on the document P1 on the basis of this reflected light are the same as in the reading process of the first reading method.

As shown in FIG. 4, the operation display portion 80 includes a display portion 81 and an operation portion 82. The display portion 81 includes, for example, a color liquid crystal display, or the like, and displays various kinds of information to the user who operates the operation display portion 80. The operation portion 82 includes one or more of various push button keys disposed adjacently to the display portion 81, a touch panel sensor disposed on the display screen of the display portion 81, and the like, and receives operations performed, for inputting various instructions, by the user of the image forming apparatus 1. The operation portion 82 includes: a start button (not shown) for instructing start of a copy operation; and a size information setting operation portion 821 for performing an operation for setting size information to be used for the reading process by the reading unit 41. Upon reception, from the user, an operation for an instruction to perform one of various processes such as an image reading process, the operation display portion 80 outputs, to the control portion 100, an operation signal corresponding to this operation.

As shown in FIG. 4, the control portion 100 is a microcomputer that includes, for example, a CPU, a ROM, and a RAM, etc. A processing program for causing the CPU of the control portion 100 to perform various processes is stored in the ROM of the control portion 100. The processing program may be stored in the ROM at the time of shipment of the image forming apparatus 1. Alternatively, the processing program may be stored in a non-transitory computer-readable information storage medium such as a CD, a DVD, or a flash memory, and may be stored from the information storage medium into the ROM of the control portion 100 after the above shipment.

In the image forming apparatus 1, the control portion 100 functions as a document detection processing portion 101, a size detection processing portion 102, a storage processing portion 103, a time counting portion 104, a first determination portion 105, a size setting portion 106, a reading control portion 107, a sheet selection processing portion 108, an image formation control portion 109, and a deletion processing portion 120 by performing, with the CPU, the various processes according to the processing program. In another embodiment, part or a plurality of the functions of the control portion 100 may be implemented as an electronic circuit. In addition, a size information storage portion 110 is provided in the RAM of the control portion 100. The size information storage portion 110 has a setting information storage area 111 and a detection information storage area 112. This point will be described later. The setting information storage area 111 is an example of a first storage area of the present disclosure, and the detection information storage area 112 is an example of a second storage area of the present disclosure.

The document detection processing portion 101 performs a document detection process of detecting the document P1 being placed on the document placement table 67, on the basis of the output signal outputted from the aforementioned document sensor 91 which is provided in the ADF 60. Specifically, the document detection processing portion 101 amplifies the output signal from the document sensor 91 with a predetermined amplification factor, and compares the amplification value with a predetermined threshold. When the amplification value is greater than the threshold, the document detection processing portion 101 determines that the document P1 has been placed on the document placement table 67. When the amplification value is less than the threshold, the document detection processing portion 101 determines that no document P1 has been placed on the document placement table 67.

The size detection processing portion 102 performs a size detection process of detecting the size of the document P1 placed on the document placement table 67, on the basis of the output signals outputted from the size sensors 92A to 92D, respectively, of the ADF 60.

The size detection processing portion 102 amplifies each of the output signals from the size sensors 92A to 92D with a predetermined amplification factor, and compares the amplification value with a predetermined threshold. Then, the size detection processing portion 102 detects the size of the document P1 placed on the document placement table 67, on the basis of a combination of comparison results of the respective output signals outputted from the size sensors 92A to 92D. The size sensors 92A to 92D and the size detection processing portion 102 form a size detection portion 200 that detects the size of the document P1 placed on the document set portion 65.

The storage processing portion 103 stores size information indicating the size of the document P1 detected by the size detection portion 200, into the detection information storage area 112 of the size information storage portion 110. The size information storage portion 110 is an example of a predetermined storage medium of the present disclosure.

As the size information to be used for the reading process by the reading unit 41, size information of a specific size that is set as a default in advance at the time of product shipment, or size information that is set by the user and indicates the size of the document P1, is stored into the setting information storage area 111 by the storage processing portion 103. The size information stored in the setting information storage area 111 also includes information indicating that the size has not been set. The image forming apparatus 1 does not include a sensor that detects the size of the document P1 placed on the document placement surface M1 (contact glass 40). Thus, the setting information storage area 111 is provided in the image forming apparatus 1, and the image forming apparatus 1 is configured to enable the reading process to be performed on the basis of the size information stored in the setting information storage area 111.

The time counting portion 104 starts time counting when the size information is stored into the detection information storage area 112 by the storage processing portion 103.

The first determination portion 105 determines whether a first operation has been performed on the image reading device 300 before the time counted by the time counting portion 104 reaches a predetermined time.

Specifically, on the basis of the output signal from the cover open/close sensor 51, the first determination portion 105 determines whether an opening/closing operation of making the document cover 50 in the closed attitude into the open attitude and then making the document cover 50 into the closed attitude again has been performed before the time counted by the time counting portion 104 reaches the predetermined time. That is, the first determination portion 105 determines whether the output signal from the cover open/close sensor 51 has changed in order of ON signal, OFF signal, and ON signal before the time counted by the time counting portion 104 reaches the predetermined time. In the present embodiment, since a probability that the document P1 has been placed on the document placement surface N1 (contact glass 40) is high when the opening/closing operation has been performed, the first determination portion 105 performs such determination. That is, the first determination portion 105 determines whether the document P1 the size of which has been detected by the size sensors 92A to 92D of the ADF 60 has been placed on the document placement surface M1 (contact glass 40) before the time counted by the time counting portion 104 reaches the predetermined time. The opening/closing operation of the document cover 50 is an example of a first operation of the present disclosure.

If the first determination portion 105 does not determine that the opening/closing operation has been performed, the deletion processing portion 120 deletes, from the detection information storage area 112, the size information stored in the detection information storage area 112.

The size setting portion 106 sets the size information stored into the detection information storage area 112 by the storage processing portion 103, as size information to be used for the reading process by the scanner portion 3. The size setting portion 106 is an example of a setting portion of the present disclosure.

The reading control portion 107 controls the reading process by the scanner portion 3. In the present embodiment, the reading control portion 107 is able to cause the scanner portion 3 to perform the reading process on the document P1 placed on the contact glass 40, on the basis of the size information set by the size setting portion 106.

The scanner portion 3, the document cover 50, the document detection processing portion 101, the size detection processing portion 102, the storage processing portion 103, the time counting portion 104, the first determination portion 105, the size setting portion 106, the reading control portion 107, and the size information storage portion 110 form the image reading device 300. An image reading device of the present disclosure may be a scanner device composed of only the image reading device 300.

The sheet selection processing portion 108 selects a sheet of a size on which the image read by the image reading device 300 should be formed, on the basis of the size information set by the size setting portion 106.

The image formation control portion 109 controls an image forming process by the image forming portion 2. The image formation control portion 109 causes the image forming portion 2 to form an image obtained through control of the reading control portion 107, on the sheet selected by the sheet selection processing portion 108. Accordingly, the image forming portion 2 forms the image on the sheet selected by the sheet selection processing portion 108.

Figure 5:
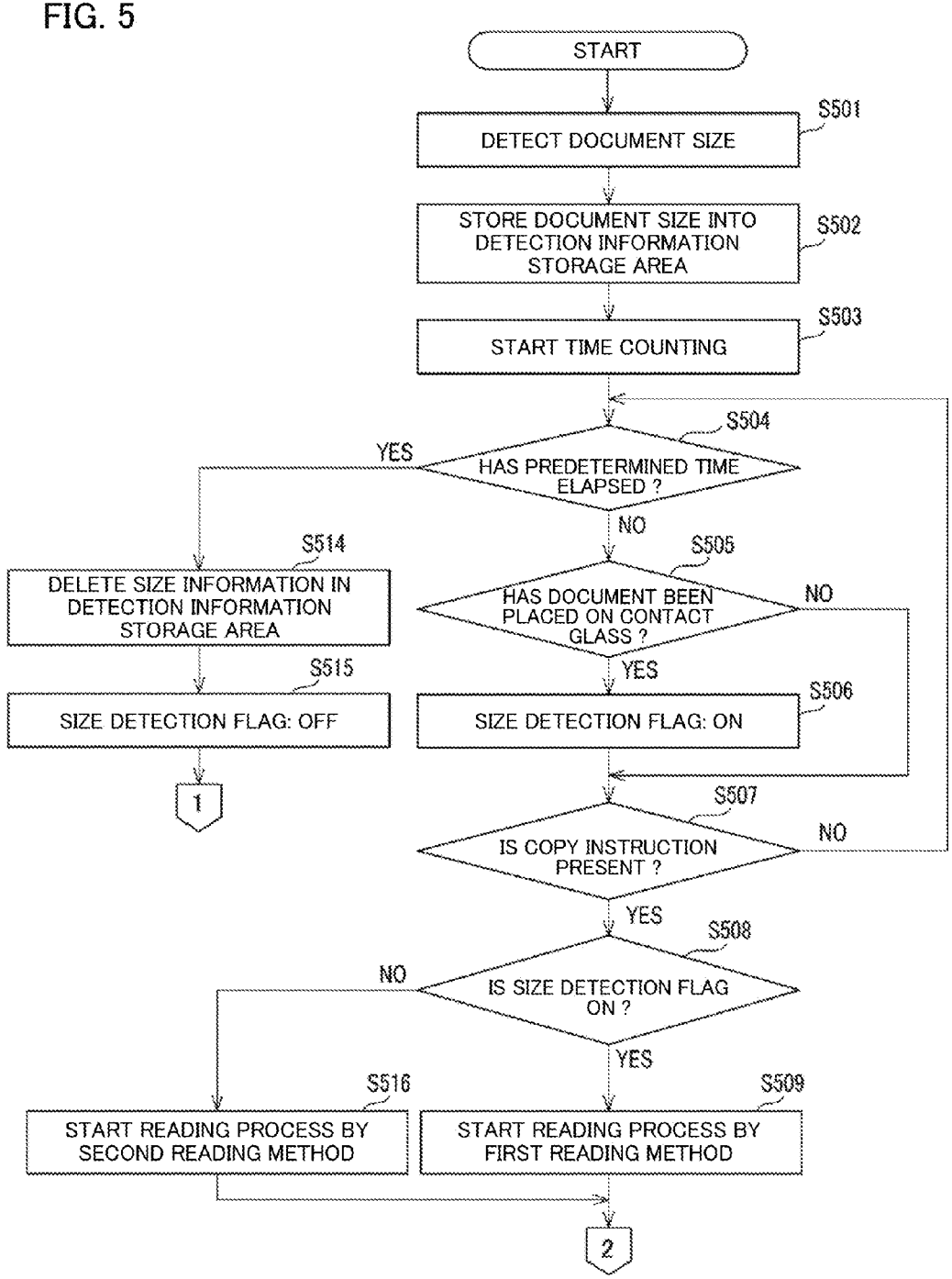
FIG. 5 is a flowchart showing a series of steps of a copy process performed by a control portion.
Figure 6:
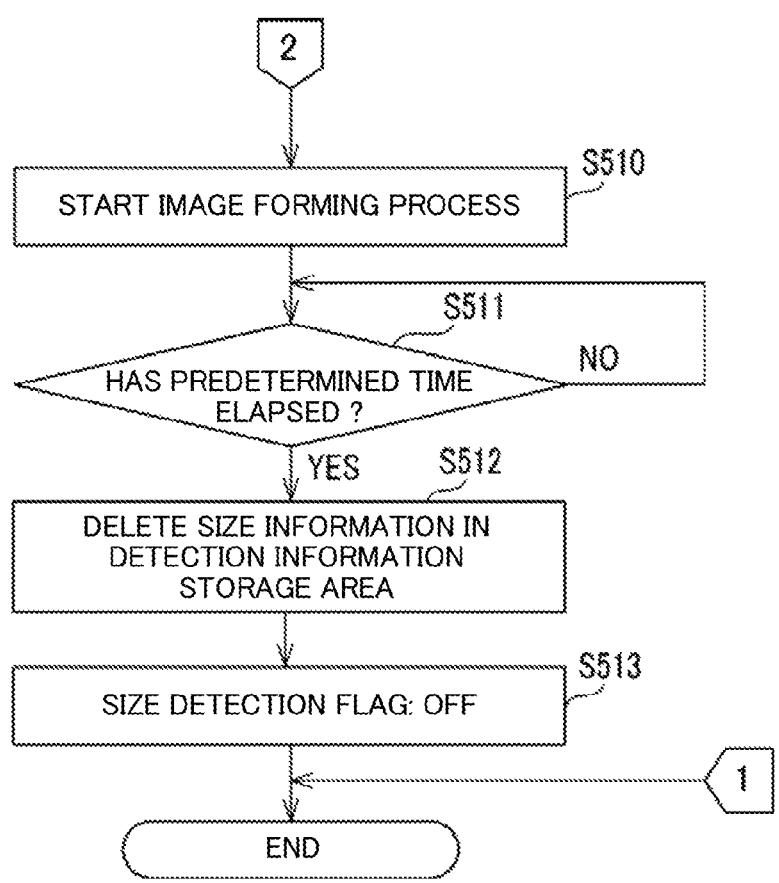
FIG. 6 is a flowchart showing the series of steps of the copy process performed by the control portion.

Next, a series of steps of a copy process performed by the control portion 100 will be described with reference to FIGS. 5 and 6. The following process is started, for example, when the document P1 being placed on the document placement table 67 is detected by the document sensor 91 and the document detection processing portion 101. In flowcharts in FIG. 5 and FIG. 6, S501, S502, . . . represent process procedure (step) numbers.

<Step S501>
In step S501, the size detection processing portion 102 detects the size of the document P1 set on the document set portion 65, on the basis of the output signals from the size sensors 92A to 92D. Step S501 corresponds to a first step of the present disclosure. Then, the control portion 100 performs a process in step S502. In another embodiment, when the size of the document P1 is detected by the size detection processing portion 102, a notification may be issued to the user, for example, by displaying the size on the display portion 81.

<Step S502>
In step S502, the storage processing portion 103 stores size information indicating the size of the document P1 detected by the size detection portion 200 in step S501, into the detection information storage area 112. Step S502 corresponds to a second step of the present disclosure. Then, the control portion 100 performs a process in step S503.

<Step S503>
In step S503, when the size information is stored into the detection information storage area 112 by the storage processing portion 103, the time counting portion 104 start time counting. Then, the control portion 100 performs a process in step S504.

<Step S504>
In step S504, the first determination portion 105 determines whether the time counted by the time counting portion 104 has reached a predetermined time. If the first determination portion 105 determines that the time counted by the time counting portion 104 has not reached the predetermined time (NO in step S504), the first determination portion 105 performs a process in step S505. On the other hand, if the first determination portion 105 determines that the time counted by the time counting portion 104 has reached the predetermined time (YES in step S504), a process in step S514 is performed. The predetermined time is an example of a predetermined standby time.

<Step S505>
In step S505, the first determination portion 105 determines whether the document P1 has been placed on the document placement surface N1 (contact glass 40).

If the first determination portion 105 determines that the document P1 has been placed on the document placement surface N1 (contact glass 40) (YES in step S505), the control portion 100 performs a process in step S506. On the other hand, if the first determination portion 105 determines that no document P1 has been placed on the document placement surface N1 (contact glass 40) (NO in step S505), the control portion 100 skips the process in step S506 and performs a process in step S507.

<Step S506>
In step S506, the size setting portion 106 sets a size detection flag to ON. Here, the size detection flag is a resister that retains a set value set by the size setting portion 106 for the size information to be used when the reading control portion 107 causes the scanner portion 3 to perform the reading process on the document P1, and is accessed by the reading control portion 107 when the reading process is performed. Specifically, the size detection flag being ON indicates that the size information has been stored in each of the setting information storage area 111 and the detection information storage area 112 and the size information stored in the detection information storage area 112 has been set as the size information to be used for the reading process by the scanner portion 3. In addition, the size detection flag being OFF indicates that the size information has not been stored in the detection information storage area 112 and the size information stored in the setting information storage area 111 has been set as the size information to be used for the reading process by the scanner portion 3. The initial value of the size detection flag is OFF.

Therefore, in the present embodiment, if the size of the document P1 is not detected by the size detection portion 200 and the reading process is performed by the scanner portion 3 on the document P1 placed on the contact glass 40, the size information stored in the setting information storage area 111 is used. On the other hand, if the size of the document P1 is detected by the size detection portion 200, the reading process by the scanner portion 3 is performed using size information indicating the detected size, not using the size information stored in the setting information storage area 111. That is, if the size of the document P1 is detected by the size detection portion 200, the size information indicating the size of the document P1 detected by the size detection portion 200 is used for the reading process by the scanner portion 3, in preference to the size information stored in the setting information storage area 111.

As described above, whether to use the size information stored in the setting information storage area 111 or the size information stored in the detection information storage area 112, for the reading process by the scanner portion 3, is determined on the basis of ON/OFF of the size detection flag. That is, the size detection flag being ON indicates that if the size information has been stored in the setting information storage area 111, the size information stored in the detection information storage area 112 has been set, in preference to the size information stored in the setting information storage area 111, as the size information to be used for the reading process.

If the first determination portion 105 determines that the opening/closing operation has been performed on the document cover 50, the size setting portion 106 sets the size detection flag to ON, and sets the size information stored in the detection information storage area 112, as the size information to be used for the reading process by the scanner portion 3. Step S506 corresponds to a third step of the present disclosure. Then, the control portion 100 performs the process in step S507.

<Step S507>

In step S507, the reading control portion 107 determines whether a copy instruction signal indicating a copy instruction has been received from the operation portion 82. If the reading control portion 107 determines that the copy instruction signal has not been received (NO in step S507), the control portion 100 returns to the process in step S504. On the other hand, if the reading control portion 107 determines that the copy instruction signal has been received (YES in step S507), the control portion 100 performs a process in step S508.

<Step S514>

If the first determination portion 105 determines, in step S504, that the time counted by the time counting portion 104 has reached the predetermined time (YES in step S504), the deletion processing portion 120 deletes the size information stored into the detection information storage area 112 in step S502, from the detection information storage area 112 in step S514. Then, the control portion 100 performs a process in step S515.

<Step S515>

In step S515, the size setting portion 106 sets the size detection flag to OFF. That is, as the size information to be used for the reading process by the scanner portion 3, the size information stored in the setting information storage area 111 is set by the size setting portion 106. Therefore, if the reading control portion 107 receives the copy instruction signal in this state (the state where the size detection flag is OFF), the reading control portion 107 causes the scanner portion 3 to perform the reading process by using the size information stored in the setting information storage area 111. After the process in step S515, the control portion 100 ends the series of steps of the copy process.

<Step S508>

In step S508, the reading control portion 107 determines whether the size detection flag has been set to ON. That is, the reading control portion 107 determines whether the size information stored in the detection information storage area 112 has been set in preference as the size information to be used for the reading process by the scanner portion 3. If the reading control portion 107 determines that the size detection flag has been set to ON (YES in step S508), the reading control portion 107 performs a process in step S509. On the other hand, if the reading control portion 107 determines that the size detection flag has not been set to ON (NO in step S508), the control portion 100 performs a process in step S516.

<Step S509>

In step S509, the reading control portion 107 causes the scanner portion 3 to start performing the reading process by the first reading method. Here, since the size detection flag has been set to ON, the reading unit 41 is moved to the position corresponding to the size of the document P1 that is indicated by the size information stored in the detection information storage area 112. Then, the control portion 100 performs a process in step S510.

<Step S510>

In step S510, the sheet selection processing portion 108 selects a sheet of a size on which an image should be formed by the image forming portion 2, on the basis of the size information set by the size setting portion 106, and the image formation control portion 109 causes the image forming portion 2 to start performing the image forming process.

<Step S511>

In step S511, the storage processing portion 103 determines whether the time counted by the time counting portion 104 has reached the predetermined time. If the storage processing portion 103 determines the time counted by the time counting portion 104 has not reached the predetermined time (NO in step S511), the storage processing portion 103 performs the process in step S511 again. On the other hand, if the storage processing portion 103 determines that the time counted by the time counting portion 104 has reached the predetermined time (YES in step S511), a process in step S512 is performed.

<Step S512>

In step S512, the deletion processing portion 120 deletes the size information stored into the detection information storage area 112 in step S502, from the detection information storage area 112. Then, the control portion 100 performs a process in step S513.

In steps S512 and S514, the deletion processing portion 120 does not necessarily need to delete the size information from the detection information storage area 112. In another embodiment, the size information may be processed so as to be prevented from being used as size information of the size of a document at the time of reading.

<Step S513>

In step S513, the size setting portion 106 sets the size detection flag to OFF. Then, the control portion 100 ends the process.

<Step S516>

In step S516, the reading control portion 107 causes the scanner portion 3 to start performing the reading process by the second reading method. Then, the control portion 100 performs the process in step S510. In this case, a possibility that no document P1 has been placed on the contact glass 40 is high. Thus, in another embodiment, a message indicating the possibility may be outputted before the reading process is started, or the reading process may be cancelled and an error message indicating cancellation of the reading process may be outputted.

In a conventional image reading device, due to limitations of the display area of a display portion, a plurality of operation buttons do not each have a large display area and are arranged adjacently to each other. Thus, an input operation of looking for and pressing an operation button corresponding to the size of a document that is a reading target is cumbersome, and an operational error such as pressing a wrong button may occur, so that there is room for improvement in terms of user-friendliness. In addition, there is a problem that, if the user does not recognize which size in a size list the size of a document that is a reading target corresponds to, the user cannot input the size of the document with the operation button.

However, in the above-described image forming apparatus 1, the size information indicating the size of the document P1 detected by the size sensors 92A to 92D of the ADF 60 is set as the size information to be used for the reading process by the first reading method to be performed later.

Accordingly, the input operation of the user looking for and pressing the operation button corresponding to the size of the document P1, which is a reading target, becomes unnecessary. In addition, an operational error such as pressing a wrong button does not occur. Furthermore, even a user who does not understand which size the described size indicates or which size in the size list the size of the document P1, which is a reading target, corresponds to is allowed to assuredly notify the image forming apparatus 1 of the size of the document P1 through a simple operation.

As described above, the image forming apparatus 1 has an advantage that the user is allowed to assuredly notify the image forming apparatus 1 of the size of the document P1 through a simple operation.

In the above embodiment, if the first determination portion 105 determines that the opening/closing operation has been performed on the document cover 50, the size setting portion 106 sets the size information stored in the detection information storage area 112, as the size information to be used for the reading process by the scanner portion 3. However, if an operation for instructing start of the copy operation is performed by using a predetermined button or key of the operation portion 82, the size information stored in the detection information storage area 112 may be set as the size information to be used for the reading process by the scanner portion 3. In this case, the operation of the predetermined button or key is an example of the first operation of the present disclosure.

Figure 7:
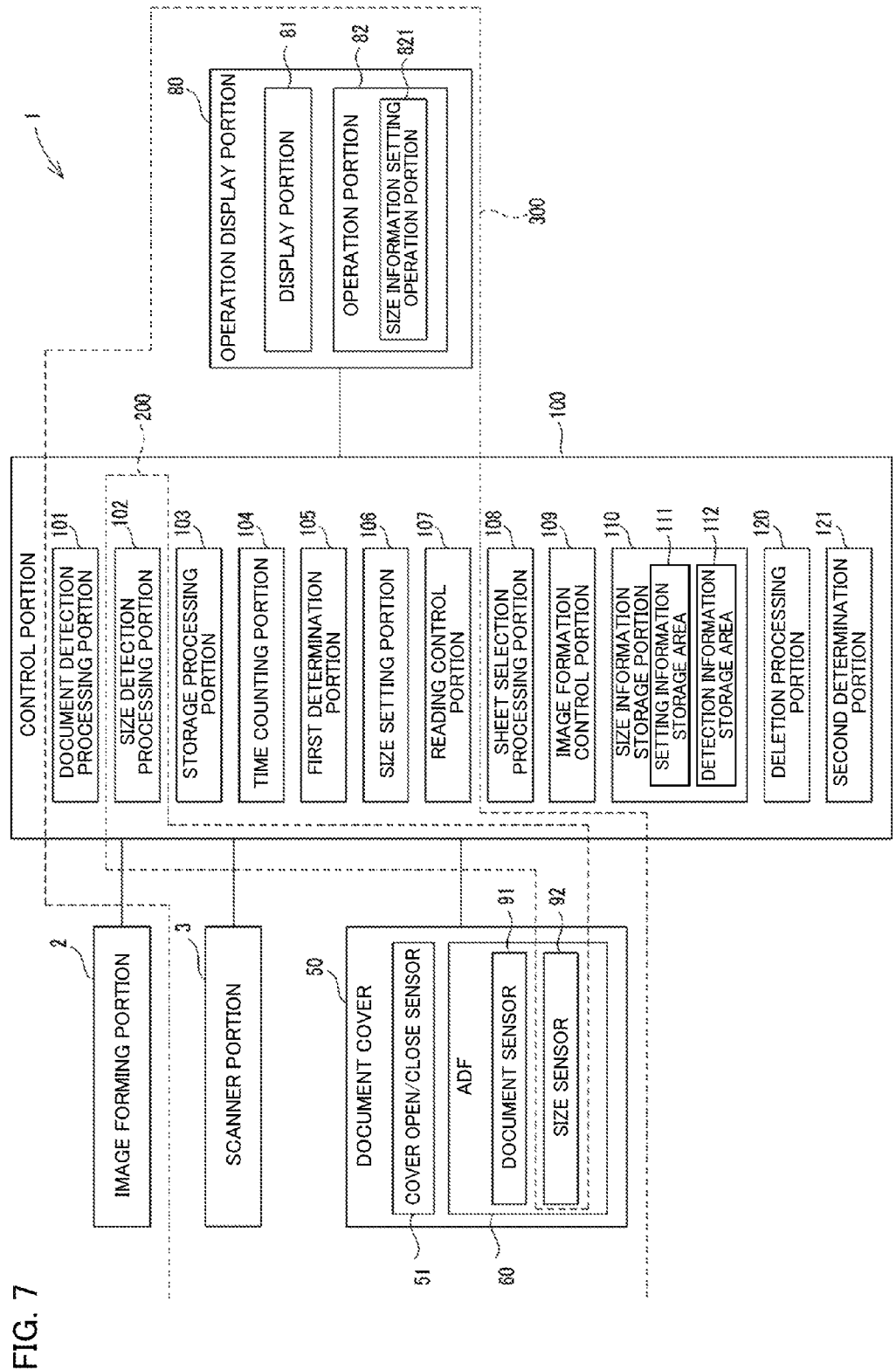
FIG. 7 is a diagram showing a modification of the image forming apparatus according to the first embodiment of the present disclosure.

As shown in FIG. 7, the image reading device 300 further includes a second determination portion 121 that determines whether the operation of the predetermined button or key of the operation portion 82 has been performed on the image reading device 300 before the predetermined time elapses. If the second determination portion 121 determines that the operation of the predetermined button or key of the operation portion 82 has been performed, the first determination portion 105 may determine whether the first operation has been performed on the image reading device 300 before a time longer than the predetermined time elapses. The operation of the predetermined button or key of the operation portion 82 is an example of a second operation of the present disclosure.

For example, if the reading control portion 107 determines, in step S507, that the copy instruction signal has not been received (NO in step S507), the second determination portion 121 determines whether an operation signal indicating the operation of the predetermined button or the like has been performed has been outputted from the operation portion 82. If the second determination portion 121 determines that the operation signal has not been received from the operation portion 82, the control portion 100 returns directly to step S504. On the other hand, if the second determination portion 121 determines that the operation signal has been received from the operation portion 82, the first determination portion 105 performs the process in step S504 on the basis of a time longer than the predetermined time.

The timing at which the process of the first determination portion 105 determining whether the operation signal has been outputted from the operation portion 82 is performed is not limited to the time when the reading control portion 107 determines that the copy instruction signal has not been received (NO in step S507). The timing may be any timing between the process in step S503 and the time when the process in step S507 is performed.

The predetermined time may be extended in proportion to the number of times of the operation of the predetermined button or key. Accordingly, the convenience in the case where the user notifies the image forming apparatus 1 of the size of the document P1 by using the ADF 60 and then causes the image forming apparatus 1 to perform the copy operation can be improved.

Second Embodiment

In the first embodiment, the size information indicating the size of the document P1 detected by the size detection processing portion 102, and the size information that is set as a default or is set by the user and indicates the size of the document P1, are stored in the different areas of the RAM (size information storage portion 110). The different areas are the setting information storage area 111 and the detection information storage area 112.

Figure 8:
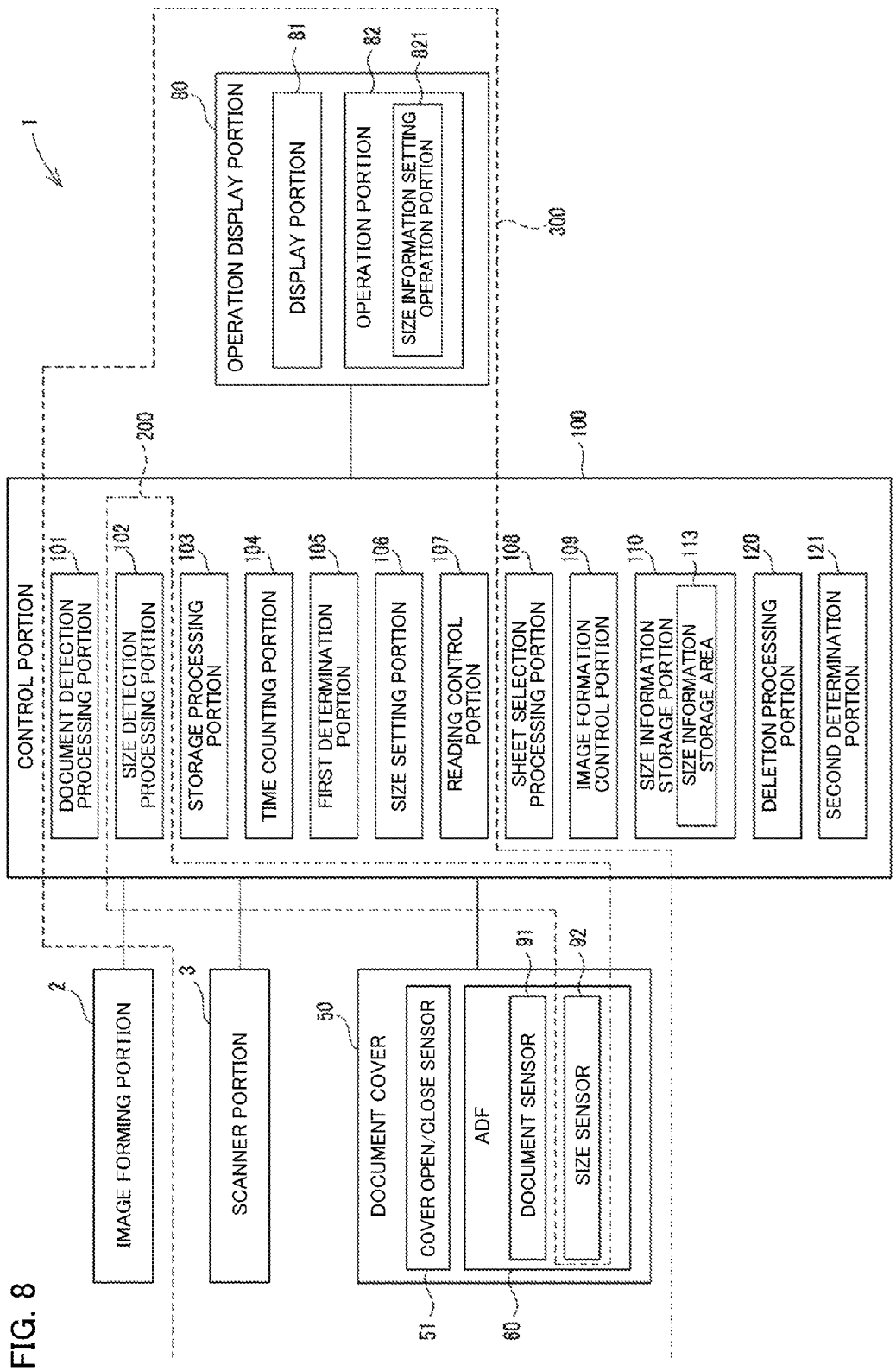
FIG. 8 is a diagram showing the configuration of an image forming apparatus according to a second embodiment of the present disclosure.

On the other hand, in an image forming apparatus 1 according to a second embodiment, as shown in FIG. 8, a shared storage area (size information storage area 113) is used as a storage area in which both of the size information is stored. The other configuration is the same as in the first embodiment, and thus only the deference from the first embodiment will be described.

Figure 9:
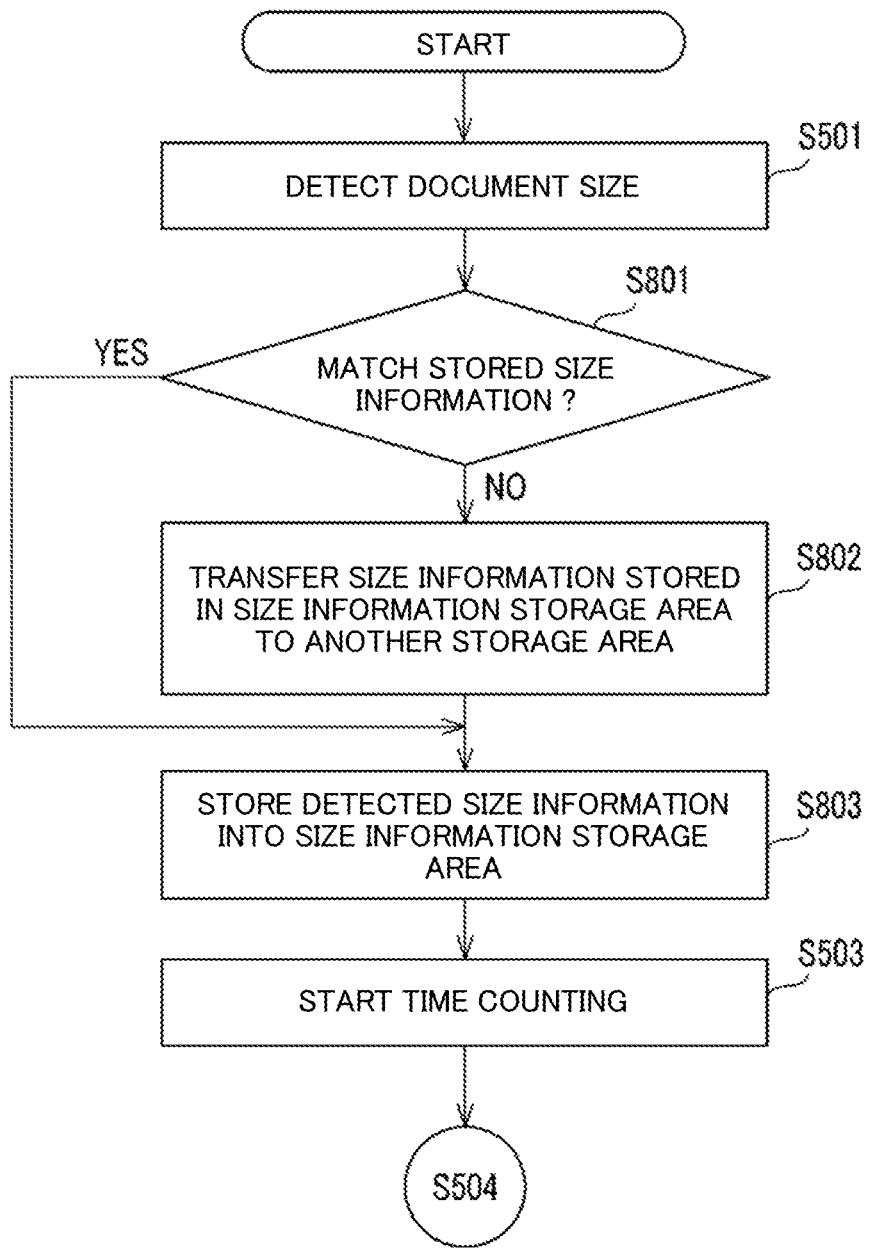
FIG. 9 is a flowchart showing a modification of the copy process performed by the control portion.

A series of steps of a copy process performed by the control portion 100 will be described with reference to FIG. 9. The following process is started, for example, when the document P1 being placed on the document placement table 67 is detected by the document sensor 91 and the document detection processing portion 101.

<Step S801>

When the size detection processing portion 102 detects the size of the document P1 in step S501, the storage processing portion 103 determines, in step S801, whether the size information matches size information already stored in the size information storage area 113. If the size information indicating the detected size has been already stored in the size information storage area 113 and the storage processing portion 103 determines that this size information and the size information of the size detected by the size detection processing portion 102 do not match each other (NO in step S801), the storage processing portion 103 performs a process in step S802. On the other hand, if the storage processing portion 103 determines the size information indicating the detected size matches the size information stored in the size information storage area 113 (YES in step S801), the storage processing portion 103 skips the process in step S802 and performs a process in step S803.

<Step S802>

In step S802, the storage processing portion 103 transfers the size information already stored in the size information storage area 113, to another storage area of the RAM. Then, the storage processing portion 103 performs the process in step S803.

<Step S803>

In step S803, the storage processing portion 103 stores the size information of the size of the document P1 detected by the size detection processing portion 102, into the size information storage area 113. Then, the control portion 100 performs the process in step S503.

Thereafter, the control portion 100 performs the processes in step S505 to step S517 similarly as in the first embodiment. However, in step S512 and step S514, the storage processing portion 103 performs a process of deleting the size information stored in the size information storage area 113 and returning the size information that has been transferred to the other storage area, to the size information storage area 113. Accordingly, the size information indicating the size of the document P1 detected by the size detection processing portion 102 is temporarily set as the size information to be used for the reading process by the scanner portion 3.

Although the preferred embodiments of the present disclosure have been described above, the image reading device according to the present disclosure includes, as essential components, a first document placement portion an example of which is the document set portion 65, a document feed portion an example of which is the ADF 60, the size detection portion 200 composed of the size sensors 92A to 92D and the size detection processing portion 102, the storage processing portion 103, a second document placement portion an example of which is the contact glass 40, an image reading portion an example of which is the reading unit 41, and the size setting portion 106, and the other components are applicable as appropriate.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading device comprising:
  a first document placement portion on which a document can be placed;
  a document feed portion including the first document placement portion and configured to feed the document placed on the first document placement portion, to a predetermined reading position;
  a size detection portion configured to detect a size of the document placed on the first document placement portion;
  a storage processing portion configured to store size information indicating the size of the document detected by the size detection portion, into a predetermined storage medium;
  a second document placement portion on which the document can be placed, the second document placement portion being different from the first document placement portion;
  an image reading portion configured to perform a reading process of scanning a read surface of the document placed on the second document placement portion, to read an image;
  a cover member configured to open/close between a closed attitude in which the cover member covers a sheet placement surface of the second document placement portion, and an open attitude in which the cover member is separated from the sheet placement surface, the cover member including the first document placement portion at a side opposite to an opposing surface opposing the sheet placement surface;
  an attitude detection portion configured to detect an attitude of the cover member;
  a first determination portion configured to determine, on a basis of a detection signal outputted from the attitude detection portion, whether a first operation of making the cover member in the closed attitude into the open attitude and then returning the cover member to the closed attitude has been performed in a period from a time when the size information is stored into the storage medium by the storage processing portion to a time when a predetermined standby time elapses, in order to determine whether the document has been placed on the second document placement portion; and
  a setting portion configured to, when the first determination portion determines that the first operation has been performed, set the size information stored into the storage medium by the storage processing portion, as size information to be used for the reading process by the image reading portion, wherein
  the storage medium has a first storage area in which size information inputted to the image reading device is stored as the size information to be used for the reading process by the image reading portion; and a second storage area in which the size information indicating the size of the document detected by the size detection portion is stored, and
  when the size information is stored into the second storage area, the setting portion preferentially sets the size information stored in the second storage area over the size information stored in the first storage area, as the size information to be used for the reading process by the image reading portion.

2. The image reading device according to claim 1, further comprising a deletion processing portion configured to delete the size information stored into the storage medium by the storage processing portion, from the storage medium, when the first determination portion does not determine that the first operation has been performed.

3. The image reading device according to claim 1, further comprising a second determination portion configured to determine whether a second operation different from the first operation has been performed on the image reading device before the standby time elapses, wherein
  when the second determination portion determines that the second operation has been performed, the first determination portion determines whether the first operation has been performed on the image reading device before a time longer than the predetermined standby time elapses.

4. The image reading device according to claim 1, further comprising a reading control portion configured to cause the image reading portion to perform the reading process on the document placed on the second document placement portion, on the basis of the size information set by the setting portion.

5. An image forming apparatus comprising:
  the image reading device according to claim 1;
  a sheet selection processing portion configured to select a sheet of a size on which the image read by the image reading device should be formed, on the basis of the size information set by the setting portion; and an image forming portion configured to form the image on the sheet selected by the sheet selection processing portion.

6. An image reading method for an image reading device including: a first document placement portion on which a document can be placed; a document feed portion including the first document placement portion and configured to feed the document placed on the first document placement portion, to a predetermined reading position; a second document placement portion on which the document can be placed, the second document placement portion being different from the first document placement portion; and an image reading portion configured to perform a reading process of scanning a read surface of the document placed on the second document placement portion, to read an image; and a cover member configured to open/close between a closed attitude in which the cover member covers a sheet placement surface of the second document placement portion, and an open attitude in which the cover member is separated from the sheet placement surface, the cover member including the first document placement portion at a side opposite to an opposing surface opposing the sheet placement surface, the image reading method comprising:

a size detecting step of detecting a size of the document placed on the first document placement portion;

a storing step of storing size information indicating the size of the document detected in the size detecting step, into a predetermined storage medium;

an attitude detecting step of detecting an attitude of the cover member;

a first determination step of determining, on the basis of a detection signal detected in the attitude detecting step, whether a first operation of making the cover member in the closed attitude into the open attitude and then returning the cover member to the closed attitude has been performed in a period from a time when the size information is stored into the storage medium in the storage step to a time when a predetermined standby time elapses, in order to determine whether the document has been placed on the second document placement portion; and a setting step of, when it is determined in the first determination step that the first operation has been performed, setting the size information stored into the storage medium in the second step, as size information to be used for the reading process by the image reading portion, wherein the storage medium has a first storage area in which size information inputted to the image reading device is stored as the size information to be used for the reading process by the image reading portion; and a second storage area in which the size information indicating the size of the document detected by the size detecting step is stored, and when the size information is stored into the second storage area, the setting step preferentially sets the size information stored in the second storage area over the size information stored in the first storage area, as the size information to be used for the reading process by the image reading portion.

* * * * *